Feb. 28, 1967 D. E. CORNELL III 3,305,965
SUCTION TYPE BLACK LIGHT INSECT TRAP
Filed May 4, 1965
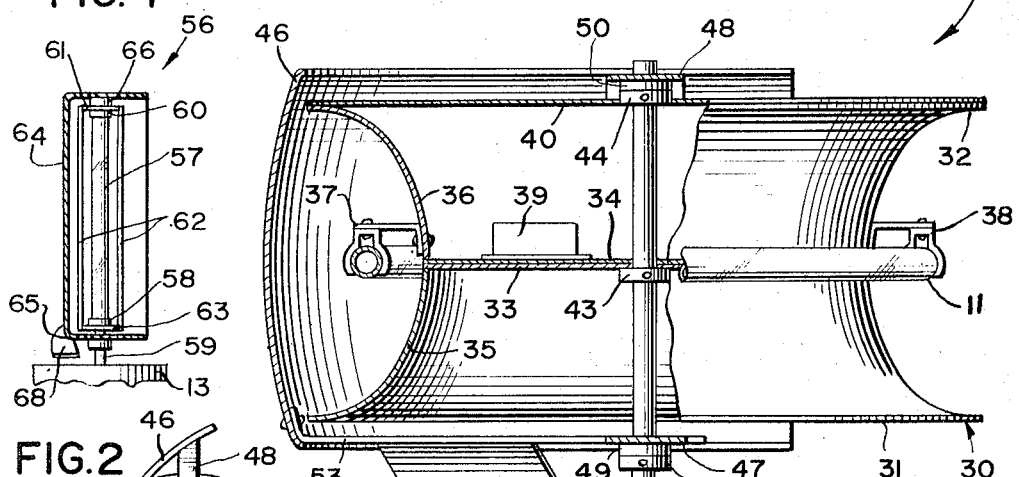
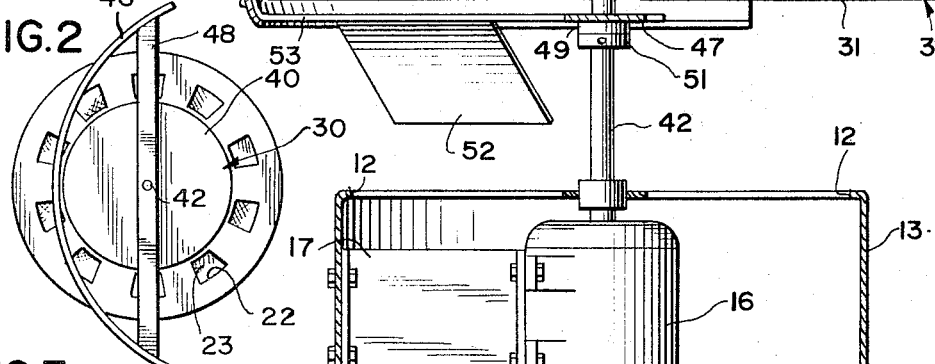
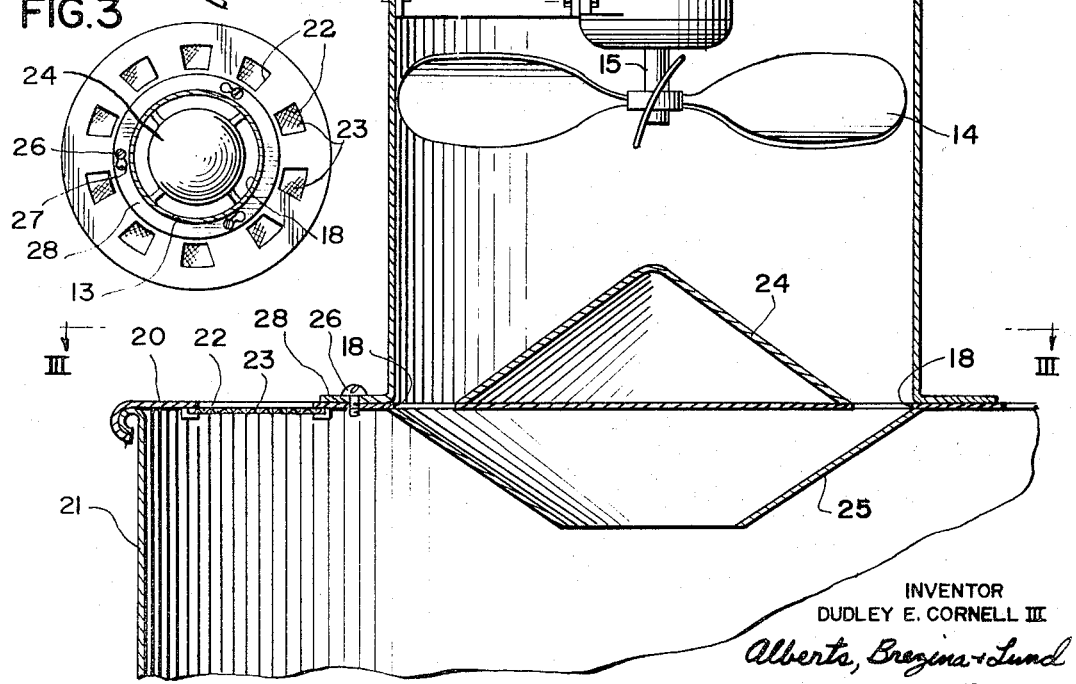
INVENTOR
DUDLEY E. CORNELL III
Alberts, Brezina + Lund
ATTORNEYS

United States Patent Office

3,305,965
Patented Feb. 28, 1967

3,305,965
SUCTION TYPE BLACK LIGHT INSECT TRAP
Dudley E. Cornell III, 221 San Pedro NE.,
Albuquerque, N. Mex. 87108
Filed May 4, 1965, Ser. No. 453,165
6 Claims. (Cl. 43—139)

This invention relates to a black light insect trap and more particularly to an insect trap using light in the near ultraviolet spectrum which is highly attractive to insects. The insect trap of this invention is highly efficient with minimum power consumption and will strongly attract insects from great distances. At the same time, the insect trap is comparatively simple and inexpensive in construction.

Black light systems have heretofore been proposed for trapping insects, using fluorescent lamps operative to radiate light in the near ultraviolet spectrum and provided with suction means for drawing air and insects from the region surrounding the lamp and propelling the insects into a suitable trap. Such systems have been quite effective but have been expensive in construction and operation.

This invention was evolved with the general object of overcoming the disadvantages of prior black light insect traps and providing a trap which is more efficient in operation and less expensive in construction and operation.

An important feature of the invention relates to the production of a flashing effect by interrupting the transmission of light from an ultraviolet lamp, insects being more highly attracted by the flashing effect.

Another important feature of the invention relates to the provision of a reflector rotatable about a horizontal axis through the ultraviolet lamp, serving to concentrate the light and to thereby improve efficiency and the distance of transmission, while at the same time producing the flashing effect to increase the attraction of insects.

A further important feature of the invention relates to the concentration of a transmission of the light into a region extending only a limited distance above ground level. Preferably, the transmission is limited to a region less than ten feet above ground level, and most preferably to a distance on the order of six feet or less. Experiments indicate that more than ninety percent of insects are attracted from positions at levels less than six feet above ground level. By so concentrating the transmission of the light, it is possible to reduce the required power output of capability of the lamp to thereby reduce power consumption, while at the same time increasing the attraction of the insects.

A specific feature of the invention relates to a special reflector construction for concentrating the light into the regions of highest effectiveness.

Another specific feature of the invention relates to the construction of an insect trap which can be readily installed on the open top of a conventional drum.

This invention contemplates other and more specific objects, features and advantages which will become more fully apparent from the following detailed description taken in conjunction with the accompanying drawings which illustrate preferred embodiments and in which:

FIGURE 1 is an elevational sectional view of a black light insect trap constructed in accordance with the principles of this invention;

FIGURE 2 is a top plan view, on a reduced scale, of the insect trap of FIGURE 1;

FIGURE 3 is a sectional view, on a reduced scale, taken substantially along line III—III of FIGURE 1; and FIGURE 4 is an elevational sectional view illustrating a modified form of black light insect trap constructed according to the principles of the invention.

Reference numeral 10 generally designates a black light insect trap constructed according to the principles of this invention, which comprises an ultraviolet fluorescent lamp 11, operative to radiate light in the near ultraviolet spectrum to attract insects thereto. Preferably, the spectrum of radiation of the lamp does not extend into the visible spectrum, but it will be understood that it may do so so long as the spectrum includes that attractive to insects. Ultraviolet light will attract almost all adult night-flying insects but generally does not attract butterflies or other unobjectionable or beneficial insects.

Insects attracted into the region around the lamp 11 are drawn downwardly and through openings 12 in the upper end of a housing or shroud 13, by means of a suction fan 14 within the shroud 13, the fan 14 being affixed on a shaft 15 of an electric motor 16 supported through a bracket 17 from the wall of the shroud 13. Insects drawn into the shroud 13 are blown downwardly by the fan 14 through openings 18 in a plate 20 and into a drum 21, plate 20 being secured on an open upper end of the drum 21 to form a lid therefor. To permit flow of air from the drum 21, a series of openings 22 are provided in the peripheral portion of the plate 20, about the shroud 13, the shroud 13 having a diameter substantially less than that of the drum 21 and being supported on a central part of the plate 20. To prevent escape of insects, screens 23 are secured on the underside of the plate 20 to cover the openings 22.

To direct the insects into the openings 18, a conically shaped member 24 is secured on the central part of the plate 20, inside the openings 18 and to deter the insects from moving upwardly through the openings into the shroud 13, a frusto-conically shaped baffle member 25 is provided extending downwardly and inwardly from points outside the openings 18.

It is found that a substantial number of insects, on the order of two percent or more, are chopped up by the fan to impinge upon and adhere to the inner surface of the shroud 13 and if such are not cleaned out periodically, preferably daily, the fan may become jammed to cause the motor 16 to burn out. In accordance with a specific feature of the device, the shroud 13 is readily removable from the plate or lid 20 for cleaning purposes. In particular, screws 26 extend through openings 27 in an annular flange portion 28 of the shroud 13, and are threaded into the lid or plate 20, the openings 27 having ends larger than the heads of the screws 26, to permit the shroud 13 to be removed by twisting through a slight angle and then lifting it upwardly, the shroud 13 being replaced by following a reverse procedure.

According to an important feature of the invention, the radiation is concentrated into a region extending from ground level to only a limited distance above ground level in order to obtain maximum effectiveness and efficiency, since it is found that most insects are relatively close to the ground. In accordance with this feature, the lamp 11 in the embodiment of FIGURE 1 is a circular fluorescent lamp and it is supported in a generally horizontal plane about a generally vertical axis with parabolic reflector means 30 being provided for focusing the light from the lamp 11 to project the light in a horizontal direction.

The parabolic reflector means 30 comprises lower and upper members 31 and 32, preferably of sheet metal, having planar wall portions 33 and 34 held in abutting relation and having annular wall portions 35 and 36 of parabolic cross-sectional shape, the outer surfaces of the wall portions 35 and 36 being plated and/or polished to provide high efficiency of reflection. The circular fluorescent lamp 11 is supported from the member 32 by brackets 37 and 38, and a conventional ballast unit 39 may be supported on the planar wall portion 34 of the upper member 32. A protective cover plate 40 is disposed over the upper end of the upper member 32.

To support the lamp 11 and reflector means 30, a vertical post 42 is fixedly secured at its lower end to a central portion of the shroud 13 and extends upwardly through central openings in the walls 33 and 34 and the plate 40. The collar 43 is affixed to the rod 42 to engage the wall portion 33 of the lower member 31 and to thereby support the reflector means, while an additional collar 44 may be affixed on the rod 42 to engage the upper surface of the top plate 40.

In accordance with an important feature of the invention, a member 46 is supported for rotation about the lamp 11 and serves as a reflector means to focus and concentrate light from the lamp into a horizontal beam which sweeps the surrounding territory, and also serves to produce a flashing effect to increase the attraction of insects to the lamp. In accordance with this feature, the member 46 has a generally parabolic shape, as shown in the top plan view of FIGURE 2, and the inner surface thereof is plated and/or polished to increase the efficiency of reflection.

To support the member 46 for rotation, lower and upper elongated plates or bars 47 and 48 are provided, secured at opposite ends to lower an upper edge portion of the plate 46, and having central openings through which the rod 43 extends. The plates 47 and 48 carry hubs 49 and 50 resting against a collar 51 and the collar 44, respectively, for permitting free rotation of the member 46. Suitable anti-friction means are preferably provided between hubs 49 and 50 and the collars 51 and 44.

To rotate the member 46, a suitable positive drive connection may be provided to the motor 16, but for simplicity and economy, a vane 52 is provided, depending on a plate portion 53 extending from the plate 47 to the lower edge portion of the member 46, in the path of air currents passing into the upper end of the shroud 13.

Referring now to FIGURE 4, reference numeral 56 generally designates a modified construction wherein a vertical straight line ultraviolet fluorescent lamp 57 is substituted for the circular lamp 11 of the embodiment of FIGURE 1. The lower end of the lamp 57 is secured through a suitable socket 58 to the upper end of a vertical rod 59 secured at its lower end to a central portion of the shroud 13. A socket 60 at the upper end of the lamp 57 is supported on a plate 61 which is supported through relatively thin vertical rods 62 from a plate 63 to which the lower socket 58 is secured.

A rotatable parabolic reflector 64 is provided to concentrate light from the lamp 57 into a horizontal beam and has lower and upper horizontal wall portions 65 and 66 respectively supported from the rod 59 and from the plate 61, for rotation about a vertical axis. To effect rotation of the parabolic reflector 64, a vane 68 is secured thereto, in the path of air currents flowing into the upper end of the shroud 13.

It will be understood that modifications and variations may be effected without departing from the spirit and scope of the novel concepts of this invention.

I claim as my invention:

1. In an insect trap, a circular fluorescent ultraviolet lamp for attracting insects thereto, insect-receiving means adjacent said lamp, means for directing insects attracted to said lamp into said insect-receiving means, means supporting said lamp in a generally horizontal plane about a generally vertical axis, and reflector means defining an annular reflecting surface of generally parabolic cross-sectional shape extending from a point inwardly from said lamp above and below the horizontal plane of said lamp to concentrate light therefrom to project horizontally.

2. In an insect trap for installation on a drum having an open top, a horizontally extending plate adapted to be secured on said open top of said drum, housing means secured on said plate and having an opening in the upper end thereof, an ultraviolet lamp supported above said housing means to attract insects thereto, fan means supported within said housing means for drawing air through said openings from the region about said lamp, said plate having at least one opening communicating with the interior of said housing for passage of insects into said drum and having at least one additional opening outside said housing means for passage of air outwardly from the interior of said drum, and screen means across said additional opening to prevent passage of insects out of said drum.

3. In an insect trap for installation on a drum having an open top, a horizontally extending plate adapted to be secured on said open top of said drum, a generally cylindrical housing having a diameter substantially less than that of said drum and secured on a central portion of said plate, an ultraviolet lamp supported above said housing to attract insects thereto, said housing having an opening in the upper end thereof, fan means supported within said housing for drawing air downwardly through said openings from the region about said lamp, said plate having at least one central opening communicating with the interior of said housing for passage of insects downwardly into said drum, trap means associated with said opening for preventing passage of insects outwardly from said drum into said housing, said plate having a plurality of additional openings therein outside said housing, and screen means across said additional openings for preventing passage of insects out through said additional openings.

4. In an insect trap adapted to be positioned at an elevation of less than ten feet at one boundary of an area to be freed of insects, a fluorescent ultraviolet lamp, insect-receiving means below said lamp including a housing having openings in the upper end thereof, means supporting said lamp on said housing, and reflective means between said support means and said lamp for projecting light from said lamp into said area to be freed of insects, a reflector supported from said housing and positioned outwardly and having a reflecting surface in horizontal alignment with said lamp, said reflecting surface extending generally vertically and having a generally parabolic horizontal cross-sectional shape.

5. In an insect trap as defined in claim 4, said lamp being a circular fluorescent lamp in a horizontal plane, said means reflecting light from one side thereof toward said area and from the opposite side thereof toward said reflector.

6. In an insect trap as defined in claim 4, said lamp being a straight line fluorescent lamp extending vertically and gneerally along the focal line of said reflecting surface.

References Cited by the Examiner

UNITED STATES PATENTS

| | | | |
|---|---|---|---|
| D. 189,782 | 2/1961 | Richardson | 43—139 |
| 1,196,341 | 8/1916 | Dawes | 240—49 |
| 1,238,220 | 8/1917 | Thurber | 240—49 |
| 1,583,975 | 5/1926 | Hunt | 43—139 |
| 1,629,506 | 5/1927 | Jensen | 240—49 |
| 1,701,674 | 2/1929 | Hitosi | 43—113 |
| 1,819,551 | 8/1931 | Gourdon | 43—139 |
| 2,013,969 | 9/1935 | Menasche | 43—139 |
| 2,931,127 | 4/1960 | Mayo | 43—139 |
| 3,013,145 | 12/1961 | Trippe | 240—49 |
| 3,058,257 | 10/1962 | Brophy et al. | 43—139 |
| 3,123,933 | 3/1964 | Roche | 43—139 |

SAMUEL KOREN, *Primary Examiner.*

ALDRICH F. MEDBERY, *Examiner.*